(12) United States Patent
Laflamme et al.

(10) Patent No.: US 11,008,156 B2
(45) Date of Patent: *May 18, 2021

(54) METERED FLUID DISPENSING SYSTEM

(71) Applicant: MHSCO HOLDINGS LLC, Providence, RI (US)

(72) Inventors: Roger J. Laflamme, Sturbridge, MA (US); Richard B. Fox, Smithfield, IN (US)

(73) Assignee: ITouch Holdings, Inc, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,660

(22) Filed: Dec. 26, 2018

(65) Prior Publication Data
US 2020/0225071 A1 Jul. 16, 2020

Related U.S. Application Data

(63) Continuation of application No. 14/256,487, filed on Apr. 18, 2014, now Pat. No. 10,160,587.
(Continued)

(51) Int. Cl.
*B05B 11/00* (2006.01)
*G01F 11/00* (2006.01)
(Continued)

(52) U.S. Cl.
CPC .... *B65D 83/0055* (2013.01); *B05B 11/00412* (2018.08); *B05B 11/3033* (2013.01);
(Continued)

(58) Field of Classification Search
CPC ............... B05B 11/303; B05B 11/3032; B05B 11/3033; B05B 11/3064; B05B 11/0043;
(Continued)

(56) References Cited

U.S. PATENT DOCUMENTS 2,855,127 A * 10/1958 Lerner ................ F04B 43/0063
222/207
5,099,885 A * 3/1992 Nilsson ............... B05B 11/3032
137/852
(Continued)

*Primary Examiner* — Frederick C Nicolas
(74) *Attorney, Agent, or Firm* — DeLio Peterson & Curcio LLC; Peter W. Peterson; Brian G. Schlosser

(57) ABSTRACT

A fluid dispensing device having a flexible fluid pouch and a dispensing assembly, the dispensing assembly having a top piece and a bottom piece, the top piece having a flexible actuator including a flexible dome and a flexible flange extension, the bottom piece having a bottom portion of a pump chamber, a pump chamber inlet, a chamber inlet valve, and a bottom portion of an outlet valve, the top piece and the bottom piece mated together to form a pump chamber and an outlet valve, the device configured to allow bidirectional fluid flow through either or both inlet and outlet valves, and to dispense a volume of fluid that is less than the volume of the pump chamber. The flexible pouch may have a single opening or two openings. In the case of a single opening, the entire dispensing assembly is in the interior of the pouch. In the case of two openings, only the flexible dome extends to the exterior of the pouch. The outlet valve is configured so that the more pressure that is applied to the flexible fluid pouch, the more tightly the outlet valve seals.

9 Claims, 17 Drawing Sheets

Related U.S. Application Data

(60) Provisional application No. 61/880,468, filed on Sep. 20, 2013, provisional application No. 61/813,371, filed on Apr. 18, 2013.

(51) Int. Cl.
*G01F 11/08* (2006.01)
*G01F 15/16* (2006.01)
*B65D 83/00* (2006.01)

(52) U.S. Cl.
CPC .......... *B05B 11/3097* (2013.01); *G01F 11/08* (2013.01); *B05B 11/303* (2013.01); *B05B 11/3032* (2013.01); *B05B 11/3035* (2013.01); *B05B 11/3064* (2013.01); *G01F 11/082* (2013.01); *G01F 11/084* (2013.01); *G01F 15/16* (2013.01)

(58) Field of Classification Search
CPC ............ B05B 11/3097; B05B 11/3035; B05B 11/00412; G01F 11/08; G01F 11/082; G01F 11/084; G01F 15/16; B65D 83/0055

See application file for complete search history.

(56) References Cited

U.S. PATENT DOCUMENTS

| | | | | |
|---|---|---|---|---|
| 5,176,510 | A * | 1/1993 | Nilsson | B05B 11/3032 222/207 |
| 5,505,341 | A * | 4/1996 | Gueret | B05B 11/3032 222/207 |
| 5,810,203 | A * | 9/1998 | Brennan | G01F 11/08 222/207 |
| 6,789,706 | B2 * | 9/2004 | Abergel | B05B 11/3032 222/207 |
| 7,997,454 | B2 * | 8/2011 | LaFlamme | A45D 34/04 222/207 |
| 8,132,696 | B2 * | 3/2012 | Mileti | B05B 11/00412 222/207 |
| 8,590,752 | B2 * | 11/2013 | Mileti | G01F 11/084 222/207 |
| 10,160,587 | B2 * | 12/2018 | LaFlamme | G01F 11/08 |
| 2008/0264973 | A1 * | 10/2008 | LaFlamme | B05B 11/3032 222/207 |
| 2009/0263176 | A1 * | 10/2009 | Mileti | B05C 17/00583 401/184 |
| 2009/0302064 | A1 * | 12/2009 | Lavabre | B05B 11/00442 222/207 |

* cited by examiner

Pouch Drawing

Top View of complete package

Pump Sub-Assembly with snap in features- Assembled

Pump Sub-Assembly with snap in features

Pump Sub-Assembly with membrane only inlet valve

METERED FLUID DISPENSING SYSTEM

FIELD OF THE INVENTION

This invention relates generally to fluid dispensers, and more particularly to a fluid dispenser for a portable flexible package having an actuator configured for single-dose dispensing.

BACKGROUND OF THE INVENTION

Various types of fluid material and media are employed for different purposes through commerce and industry. For example, there are various products in the personal care, home care, air care, transportation care, and food industries that require some type of dispensing of a fluid material from a source of such material. When this material is sold in commerce, it must be contained and stored in some type of container. When that product is used, it must be dispensed from its storage container to a location for use.

In the prior art, there are many different types of dispenses for delivering fluid material. For example, a flexible container body with a nozzle tip is commonly provided for such a purpose. An application of such use is for the dispensing of ketchup where the container body is squeezed by the user to urge the fluid material out from the nozzle tip and accurately to a desired location. The amount of fluid delivered is determined by how much the user squeezed the container body. However, this yields erratic results where more or less fluid material is delivered on each successive squeeze of the container body. Also, the container must be held upright to avoid leakage because no valves are employed.

In another example of a prior art dispensing device, a flexible container holds a volume of fluid material to be delivered. A single one-way check valve is provided as an exit port from the flexible container. When the flexible body is squeezed, the material is urged out under pressure through the valve.

SUMMARY OF THE INVENTION

According to embodiments of the invention, there is provided a fluid dispensing device having a flexible actuator including a flexible dome and a flexible flange extension; a base portion including a bottom portion of a pump chamber, a pump chamber inlet, and a bottom portion of an outlet valve, said bottom portion of an outlet valve having an upper surface configured to mate with a bottom surface of said flexible flange extension; a dispensing head including a fluid outlet channel in fluid communication with said outlet valve, where the flexible actuator is mated to the base portion so that said flexible bulb and said bottom portion of a pump chamber form a pump chamber, and so that said flexible flange extension and said bottom portion of said outlet valve form an outlet valve; the fluid dispensing device also having an inlet valve positioned in proximity to said pump chamber inlet to selectively permit fluid flow through pump chamber inlet.

According to another embodiment of the invention, the fluid dispensing device is configured to dispense a volume of fluid that is less than the volume of said pump chamber.

According to another embodiment of the invention, the outlet valve of the fluid dispensing device permits the flow of fluid toward the fluid outlet channel during activation of the flexible dome, and toward the pump chamber when the flexible dome is released.

According to another embodiment of the invention, the inlet valve of the dispensing device initially permits fluid flow away from the pump chamber during activation of the flexible dome, and permits the flow of fluid into the pump chamber following release of the flexible dome. According to another embodiment of the invention, the inlet valve is formed as part of the flexible actuator. According to another embodiment of the invention, the inlet valve is attached to the base portion. According to another embodiment of the invention, the inlet valve comprises a flap integrally formed with said flexible actuator and a flexible film attached to said bottom part.

According to another embodiment of the invention, a flexible fluid pouch is provided having two openings, wherein a first opening is sealed around the flexible actuator of the dispensing assembly, and a second opening is sealed around the dispensing head of the dispensing assembly, and wherein the flexible flange extension and all of the bottom portion reside in the interior of said flexible fluid pouch.

According to another embodiment of the invention, the flexible pouch has only a single opening, and the single opening is sealed around the dispensing head of the dispensing assembly, and wherein the entirety of said dispensing assembly, i.e., the top piece comprising the flexible actuator and the bottom piece, reside in the interior of said flexible fluid pouch.

According to another embodiment of the invention, the fluid dispensing device defines a fluid flow path having an acute angle between the outlet valve and the fluid outlet channel.

According to another embodiment of the invention, the fluid dispensing device is configured so that increases in pressure on the flexible fluid pouch cause the outlet valve to seal more tightly against unintentional release of fluid.

DETAILED DESCRIPTION OF THE PREFERRED EMBODIMENTS

The following description is of particular embodiments of the invention, set out to enable one to practice an implementation of the invention, and is not intended to limit the disclosed or preferred embodiments, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
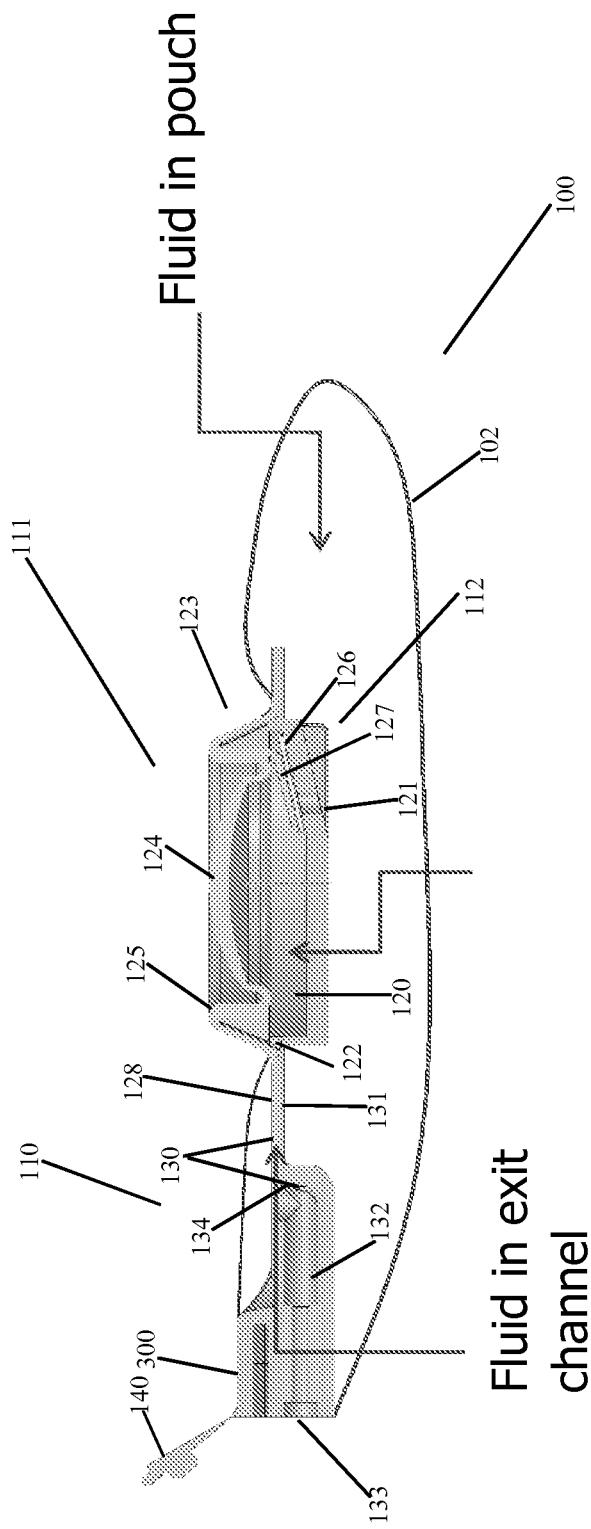
FIG. 1 is a representative cutaway side view of an assembly according to an embodiment of the invention, at rest after priming.
Figure 17:
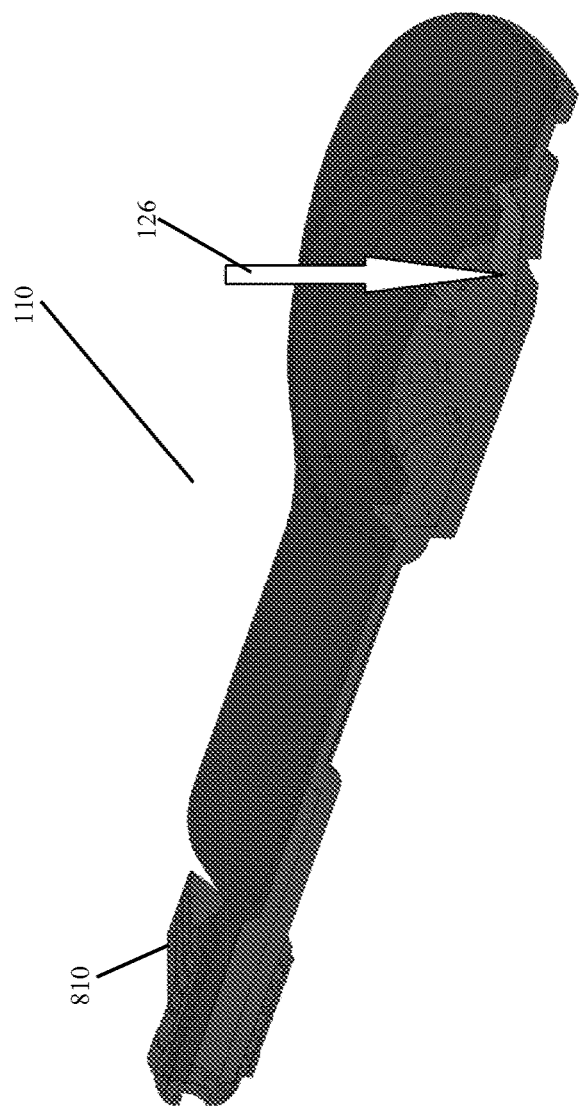
FIG. 17 is a cutaway perspective view of an embodiment according to the invention.

Referring to FIG. 1, a fluid dispenser (shown generally at 100) is provided having a flexible pouch 102 containing a fluid therein that is to be dispensed. A dispensing assembly (shown generally at 110) is provided in fluid communication with an interior of flexible pouch 102, and is sealed to the flexible pouch around the perimeter of dispensing assembly 110. More specifically, flexible pouch 102 may be provided with two openings, one opening sized to fit around and sealed to the perimeter of flexible actuator 123, and another opening sized to fit around and be sealed to neck 300. According to this embodiment, most of the dispensing assembly is situated inside the flexible pouch, and the only portion of the dispensing assembly that resides outside the flexible pouch is flexible actuator 123, and possibly a portion of neck 300. Dispensing assembly is preferably made of two molded pieces, top piece 111 and bottom piece 112 which are snapped and/or sealed together, and which preferably have male-female mating faces to improve fit/matching registration. Generally, top piece 111 is shown in the figures in green, and bottom piece 112 is shown in orange (except FIG. 2, in which bottom piece 112 is shown in blue, and FIGS. 13-17, in which bottom piece 112 is shown in gray). According to various embodiments, top piece 111 may comprise only the flexible actuator 123 (including bulb 124 and circumferential wall 125), the flange, the flexible flange extension 128, and optionally the pump chamber inlet closure 127, and bottom piece 112 may comprise the remainder of the assembly, including the bottom portion of chamber 120, pump chamber inlet 121, the bottom portion of intermediate channel 131, all of outlet channel 132 and all of neck 300. According to other embodiments of the invention, the outlet channel 123 and the neck 300 (also referred to as head 800 in various figures), may be formed by a mating of the top part 111 to the bottom part 112, see, e.g., FIG. 17.

In use, a user operates dispensing assembly 110 to draw fluid from inside of flexible pouch 102 and to dispense an amount of the fluid that has been drawn into dispensing assembly 110, all as further described below.

Dispensing assembly 110 includes a pump chamber 120 and a fluid exit channel 130 in fluid communication with the pump chamber 120. As discussed in further detail below, pump chamber 120 serves as an intermediate chamber to pull a volume of fluid into dispensing assembly 110, and fluid exit channel 130 serves to deliver a portion of such volume of fluid from pump chamber 120 to the outside of fluid dispenser 100.

Pump chamber 120 includes a pump chamber inlet 121 that opens at one end to an interior of flexible pouch 102, and opens at the opposite end into the interior of pump chamber 120. Ultimately, a portion of the fluid that is drawn into the interior of pump chamber 120 from the interior of flexible pouch 102 is delivered to fluid exit channel 130 through fluid outlet 122 from pump chamber 120.

In order to draw fluid into pump chamber 120 and to push a portion of such fluid downstream to fluid exit channel 130, a flexible actuator 123 is provided having a depressible bulb 124 that may be engaged by a user's finger when they wish to dispense a volume of fluid from fluid dispensing 100, which dispensing operation will be discussed in greater detail below. Flexible actuator 123 may be formed of a variety of flexible materials, such as (by way of non-limiting example) a thermoplastic polyolefin elastomer. A suitable and exemplary thermoplastic polyolefin elastomer material is readily commercially available from The Dow Chemical Company under the name ENGAGE™ 8401. Flexible actuator 123 also includes a raised circumferential wall 125 that encircles depressible bulb 124, with a bottom-most portion of depressible bulb 124 being attached to a bottom, interior edge of circumferential wall 125. When a user engages flexible actuator to dispense a volume of fluid from fluid dispenser 100, depressible bulb 124 deforms from a concave structure to a convex structure (as it is pushed downward into the body of pump chamber 120), while raised circumferential wall 125 generally maintains its shape.

A thin cover 126 may optionally be positioned over pump chamber inlet 121, and is preferably formed of a thin, flexible film that is affixed at one end to an interior of pump chamber 120, and is not fixed at the other end which is in turn positioned over pump chamber inlet 121. Thus, thin cover 126 may freely move with respect to pump chamber inlet 121 to allow fluid to flow from the interior of pouch 102 to the interior of pump chamber 120, and likewise from pump chamber 120 back to the interior of pouch 102, depending upon the position of flexible actuator 123 (as discussed in greater detail below).

Alternatively, or in addition to thin cover 126, a pump chamber inlet closure 127 may be provided and positioned over pump chamber inlet 121, movable from an open position (allowing fluid to flow from the interior of flexible pouch 102 to an interior of pump chamber 120, and vice versa) to a closed position (preventing fluid from flowing from the interior of flexible pouch 102 to an interior of pump chamber 120, and vice versa). Pump chamber inlet closure 127 is attached at one end to preferably the bottom-most portion of circumferential wall 125, which point of attachment creates a hinge allowing the remaining portion of closure 127 to move between its open and closed positions. Pump chamber inlet closure is preferably formed of the same material as flexible actuator 123, and is likewise preferably integrally formed therewith. Preferably, in an at-rest position, but after a user has at least initially pumped flexible actuator 123 so as to prime dispensing assembly 110 with a volume of fluid, a slight gap exists between the bottom surface of pump chamber inlet closure 127 and the top of pump chamber inlet 121. Likewise, when at rest, a very slight gap between such thin film inlet cover 126 and the top of pump chamber inlet 121—only a slight gap is necessary at this stage to allow bi-directional flow between the interior of pump chamber 120 and the interior of flexible pouch 102. Pump chamber inlet closure 127 is configured to (as discussed in greater detail below) flex downwardly and press against thin film inlet cover 126 (if present) at a point during the downward stroke of flexible actuator 123, thus pressing itself against the top portion of pump chamber inlet 121, or pressing thin film inlet cover 126, if present, against the top portion of pump chamber inlet 121, and preventing flow between the interior of pump chamber 120 and the interior of flexible pouch 102. If chamber inlet closure 127 is not present, and only thin film inlet cover 126 is present, the downward stroke of flexible actuator 123 causes thin inlet cover 126 to press against the top portion of pump chamber inlet 121, preventing flow between the interior of pump chamber 120 and the interior of flexible pouch 102.

As mentioned briefly above, fluid exit channel 130 is in fluid communication with pump chamber 120. Fluid exit channel 130 includes an intermediate chamber 131 and an outlet channel 132. Intermediate chamber 131 opens at one end into pump chamber 120, and at the opposite end to outlet channel 132. The opposite end of outlet channel 132 comprises fluid outlet 133 from which fluid exits fluid dispenser 100. A flange is positioned around the base of circumferential wall 125 of flexible actuator 123, and a portion of the flange is extended in flexible flange extension 128. Flexible flange extension 128 is positioned over intermediate chamber 131 and, in the at-rest position shown in FIG. 1, lies flat on intermediate chamber 131, acting as a valve to selectively prevent flow of fluid between outlet channel 132 and pump chamber 120. The bottom surface of flexible flange extension 128 is configured to mate with the top surface of the corresponding surface of the bottom piece 112. According to one embodiment, both surfaces are flat. According to other embodiments, each surface may have a profile that is complementary to the other so that they form a seal when they are pressed together. Likewise, the end of intermediate chamber 131 that meets outlet channel 132 preferably opens into an acute bend 134, such that fluid that is being dispensed must travel through a non-straight path as it travels through fluid dispenser 102.

A movable cap 140 may be provided at the end of fluid exit channel 130 and is preferably hinged thereto, such that movable cap 140 may be selectively positioned over fluid outlet 133 to close the same, or may be pivoted to the open position shown in FIG. 1 when the fluid dispenser 100 is in use. Movable cap 140 may be molded integrally with bottom piece 112 or it may be manufactured separately and affixed to a portion of bottom piece 112.

Figure 2:
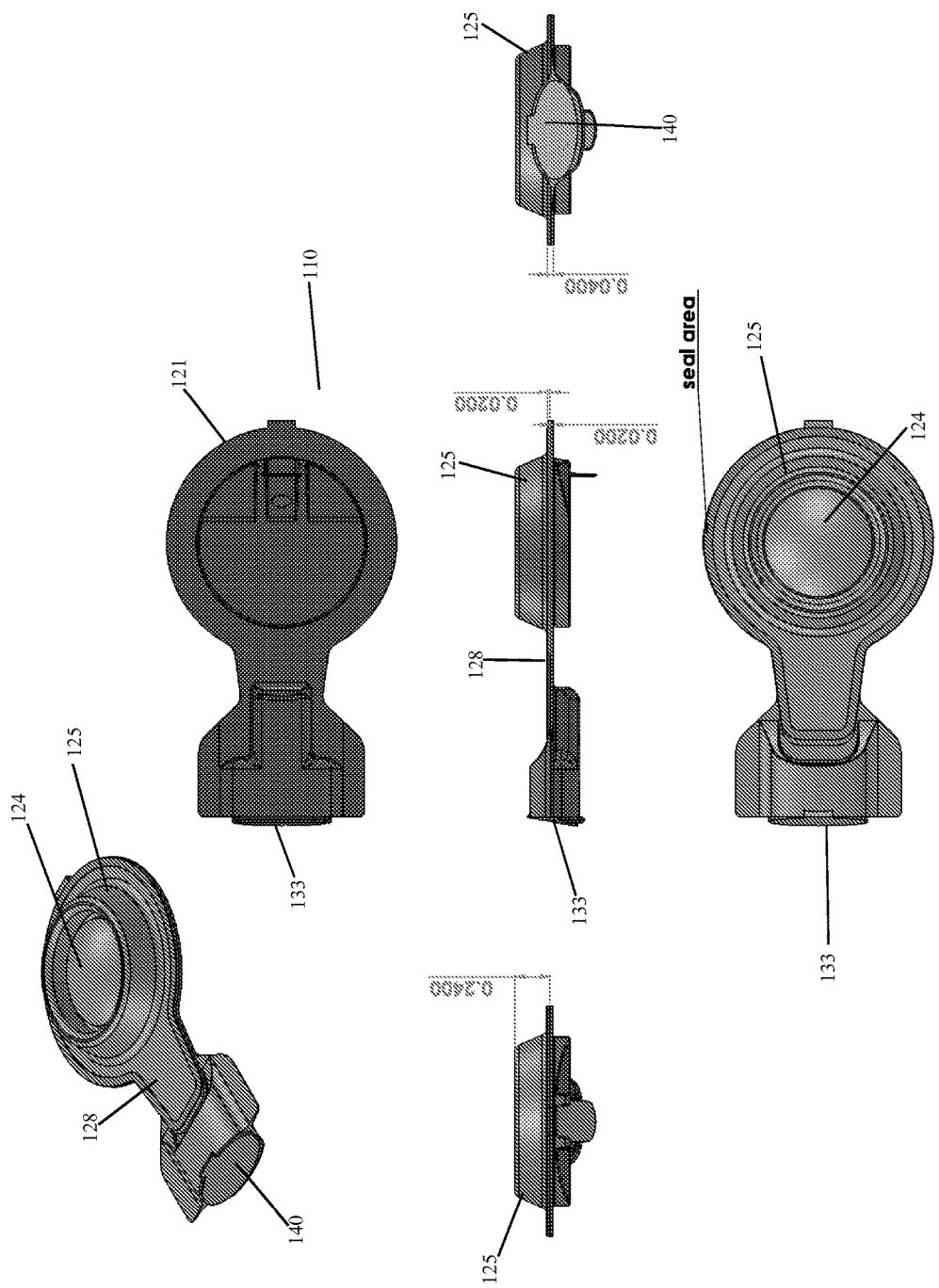
FIG. 2 shows various external views of a dispensing assembly according to the invention.

FIG. 2 shows a variety of views of the exterior structure of dispensing assembly 110 as described above.

Figure 3:
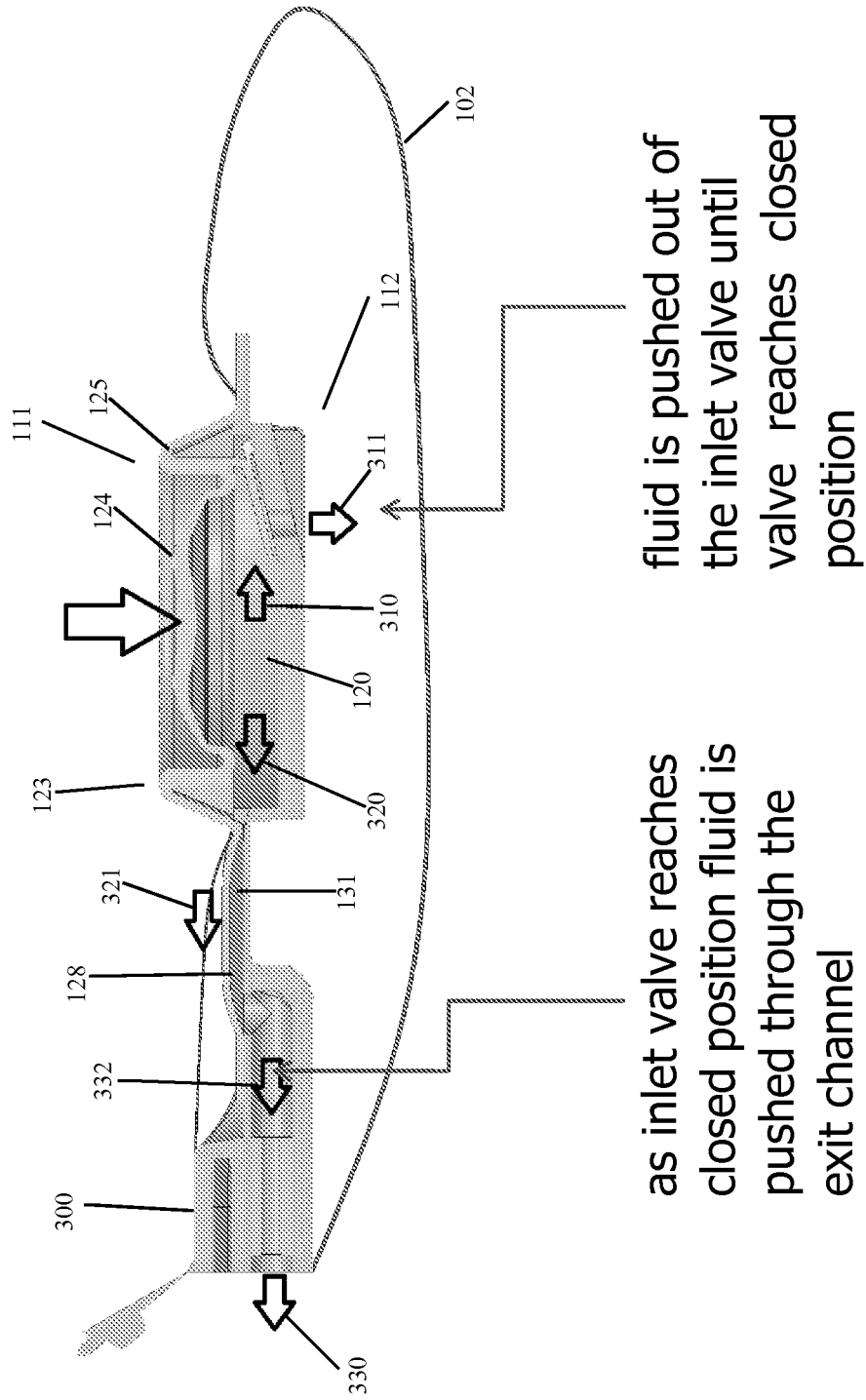
FIG. 3 is a representative cutaway side view of the embodiment shown in FIG. 1, at a first stage of activation.

Next, and with regard to FIGS. 3-7, fluid dispenser 100 is shown in various stages of a dispensing operation. First, FIG. 3 shows fluid dispenser 100 at a first stage of activation, in which the dome 124 of flexible actuator 123 is being depressed downward and into pump chamber 120. As bulb 124 starts its downward stroke, fluid that is positioned within pump chamber 120 flows in two directions from pump chamber 120. Namely, as the pressure in pump chamber 120 is not yet sufficient to have closed thin film inlet cover 126 or to have moved pump chamber inlet closure 127, fluid flows in the direction of arrows 310 and 311 from pump chamber 120 into the interior of flexible pouch 102. Simultaneously, fluid flows from pump chamber 120 in the direction of arrows 320-322 into intermediate chamber 131, lifting flexible flange extension 128 to the raised position shown in FIG. 3 so as to allow fluid to flow through intermediate chamber 131, and ultimately to outlet channel 132 where it exits fluid dispenser 100 (arrow 330).

Figure 4:
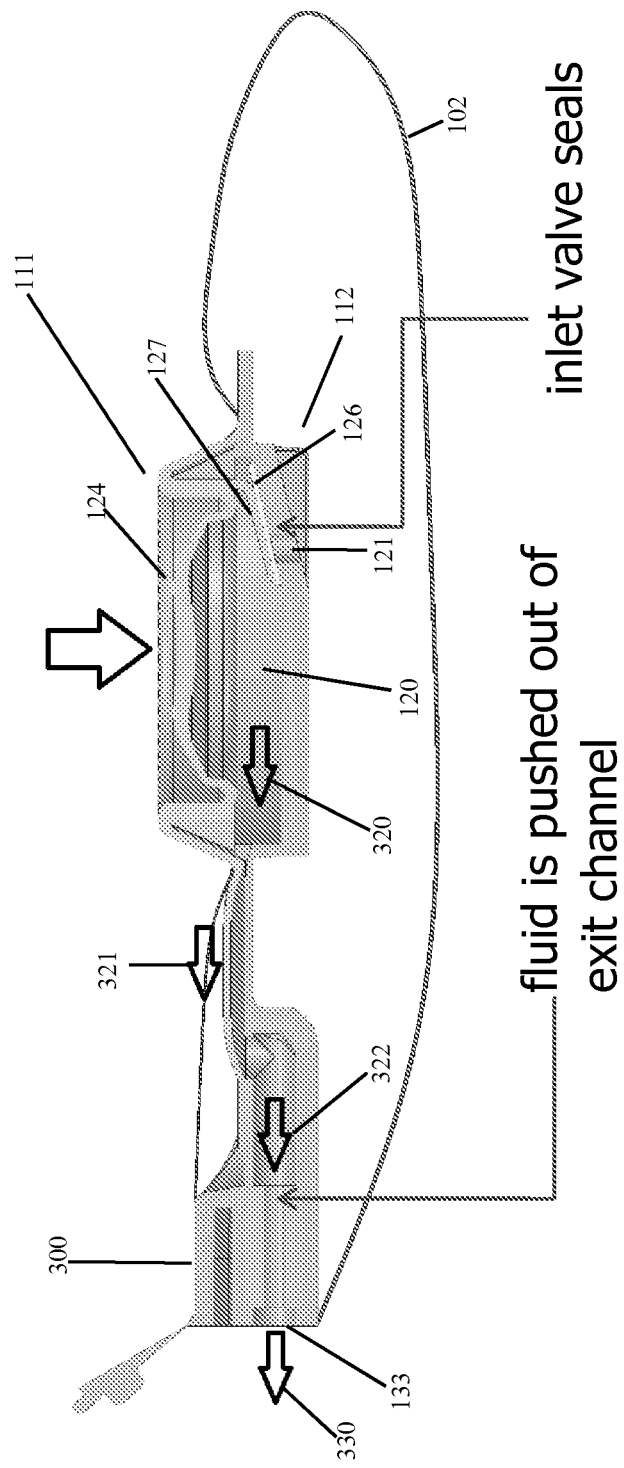
FIG. 4 is a representative cutaway side view of the embodiment shown in FIG. 1, at a second stage of activation.

Next, as shown in FIG. 4, as bulb 124 is pressed further downward into pump chamber 120, and as the pressure within pump chamber 120 thus increases, pump chamber inlet closure 127 is directed downward toward pump chamber inlet 121 and, along with pressing thin film inlet cover 126 against pump chamber inlet 121, closes off pump chamber inlet 121 to prevent further fluid flow between the interior of pump chamber 120 and the interior of flexible pouch 102. In this condition, fluid flows only in the direction of arrows 320-322 through fluid exit channel 130 and outward through fluid outlet 133 in the direction of arrow 330.

Figure 5:
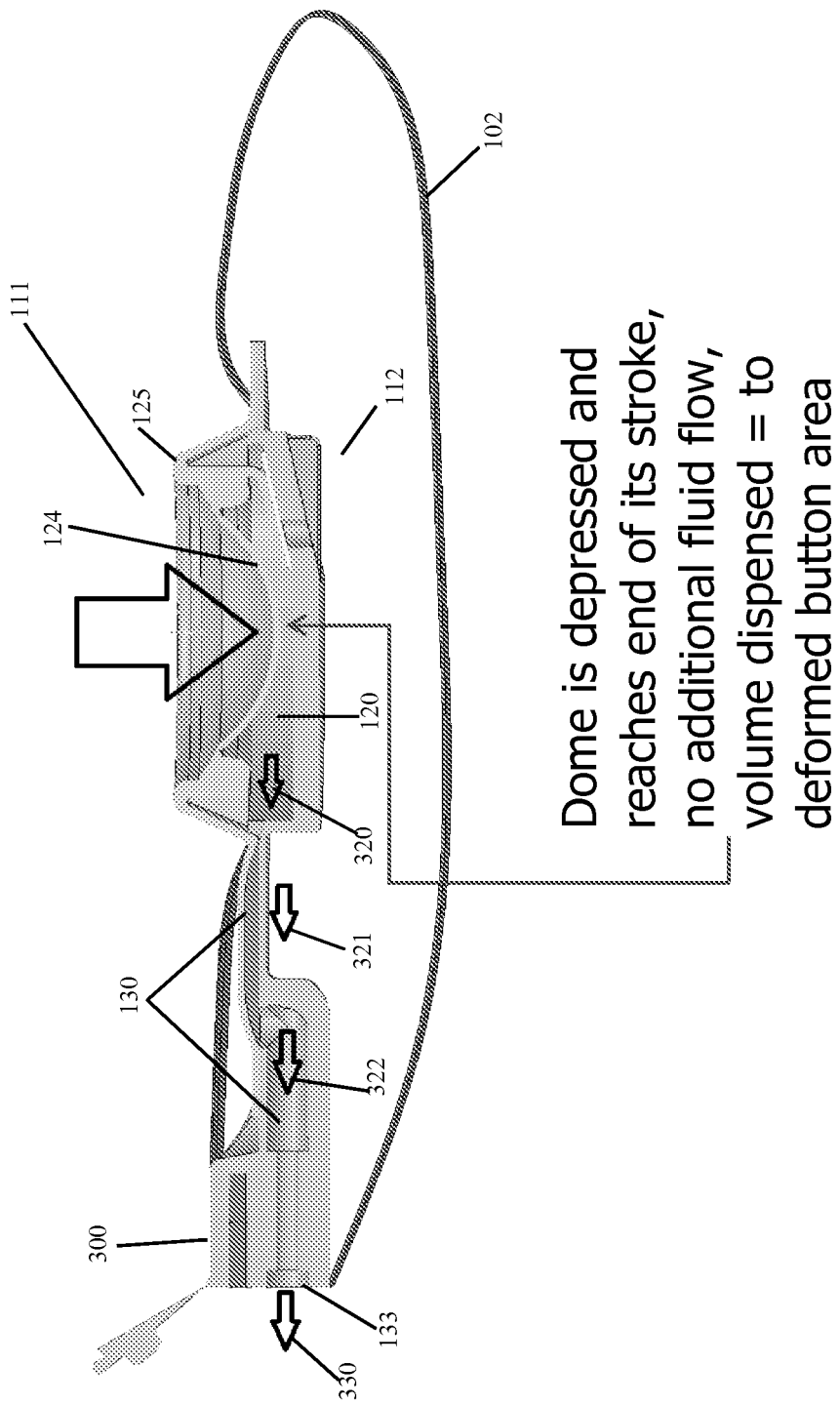
FIG. 5 is a representative cutaway side view of the embodiment shown in FIG. 1, at a third stage of activation.

Next, and as shown in FIG. 5, as bulb 124 is pressed further down into pump chamber 120, it reaches its maximum stroke and completes the dispensing of a portion of the volume of the fluid that was originally within pump chamber 120, again causing fluid to flow only in the direction of arrows 320-322 through fluid exit channel 130 and outward through fluid outlet 133 in the direction of arrow 330. Notably, the volume of fluid that is so dispensed from fluid dispenser 100 is thus the volume that has been displaced by the downward stroke of bulb 124, less the volume that returns into flexible pouch 102 through pump chamber inlet 121 (as shown in FIG. 3). Thus, the volume of fluid dispensed is less than the fluid present in the pump chamber. A portion of the fluid that was originally present in pump chamber 120 at the start of the dispensing operation (i.e., that volume of fluid present in the dispensing assembly 110 in FIG. 1) thus remains in pump chamber 120 at the completion of the downstroke of bulb 124, such that pump chamber 120 remains partially primed for the next desired dispensing operation. Likewise, by maintaining some amount of fluid in pump chamber 120, the amount of fluid that is sucked back into pump chamber 120 from fluid exit channel 130 is likewise minimized, in turn minimizing air pockets in the fluid that is dispensed in the next dispensing operation.

Figure 6:
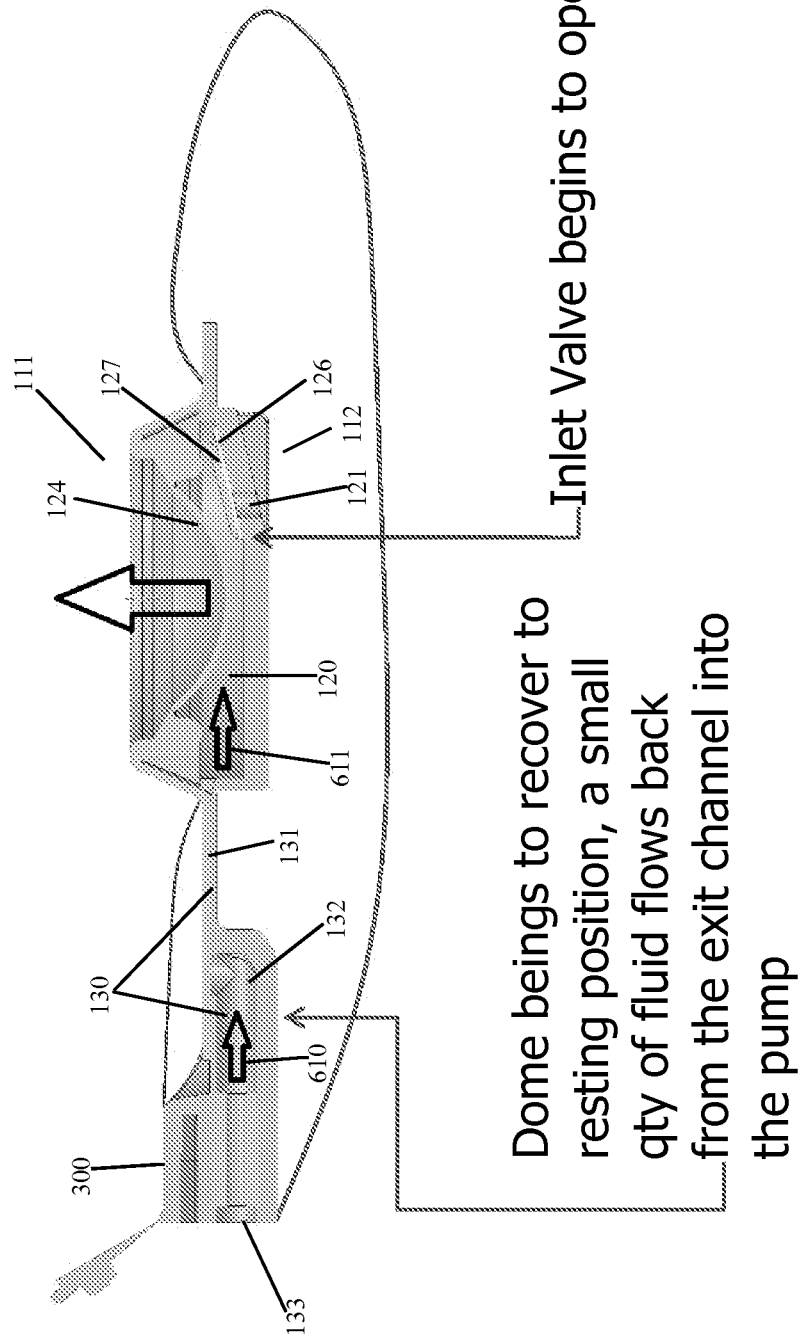
FIG. 6 is a representative cutaway side view of the embodiment shown in FIG. 1, at a first stage of recovery.

Next, and with reference to FIG. 6, after fluid has been dispensed, dispensing assembly 110 is configured to proceed through a recovery process to return it to the condition reflected in FIG. 1. Namely, bulb 124 of flexible actuator 123 is allowed to rise back to its at-rest position that is reflected in FIG. 1. As bulb 124 begins to rise, a small amount of fluid in fluid exit channel 130 flows back toward pump chamber 120 in the direction of arrows 610 and 611.

During this process, flexible flange extension 128 of flexible actuator 123 is preferably in its at-rest position (collapsed against intermediate chamber 131), thus limiting the flow of fluid from outlet channel 132 back toward pump chamber 120. Likewise during this process, pump chamber inlet closure 127 begins to lift off of pump chamber inlet 121, in turn allowing thin film inlet cover 126 to lift off of pump chamber inlet 121 so as to allow fluid to begin flowing into the interior of pump chamber 120 from the interior of flexible pouch 102.

According to a particular and unexpected advantage of the invention, due to the fact that fluid passage 131 and flexible flange extension 128 are situated inside of the flexible pouch, large amounts of pressure may be applied to flexible pouch 102 without causing the unintended escape of fluid from the dispensing assembly because any pressure applied to flexible pouch 102 will translate to the outside of flexible flange extension 128, sealing it against bottom portion of fluid passage 131 and preventing the movement of fluid.

Indeed, the more pressure that is applied to flexible pouch 102, the more tightly that flexible flange extension 128 is pressed against the bottom of fluid passage 131. This represents a significant advantage over prior art dispensing devices in which a sufficient amount of pressure applied, intentionally or unintentionally, to the flexible pouch would cause one or more valves to reverse or otherwise fail, causing liquid to unintentionally exit the dispensing device, potentially resulting in the ruin or soiling of neighboring fabrics and other materials.

Figure 7:
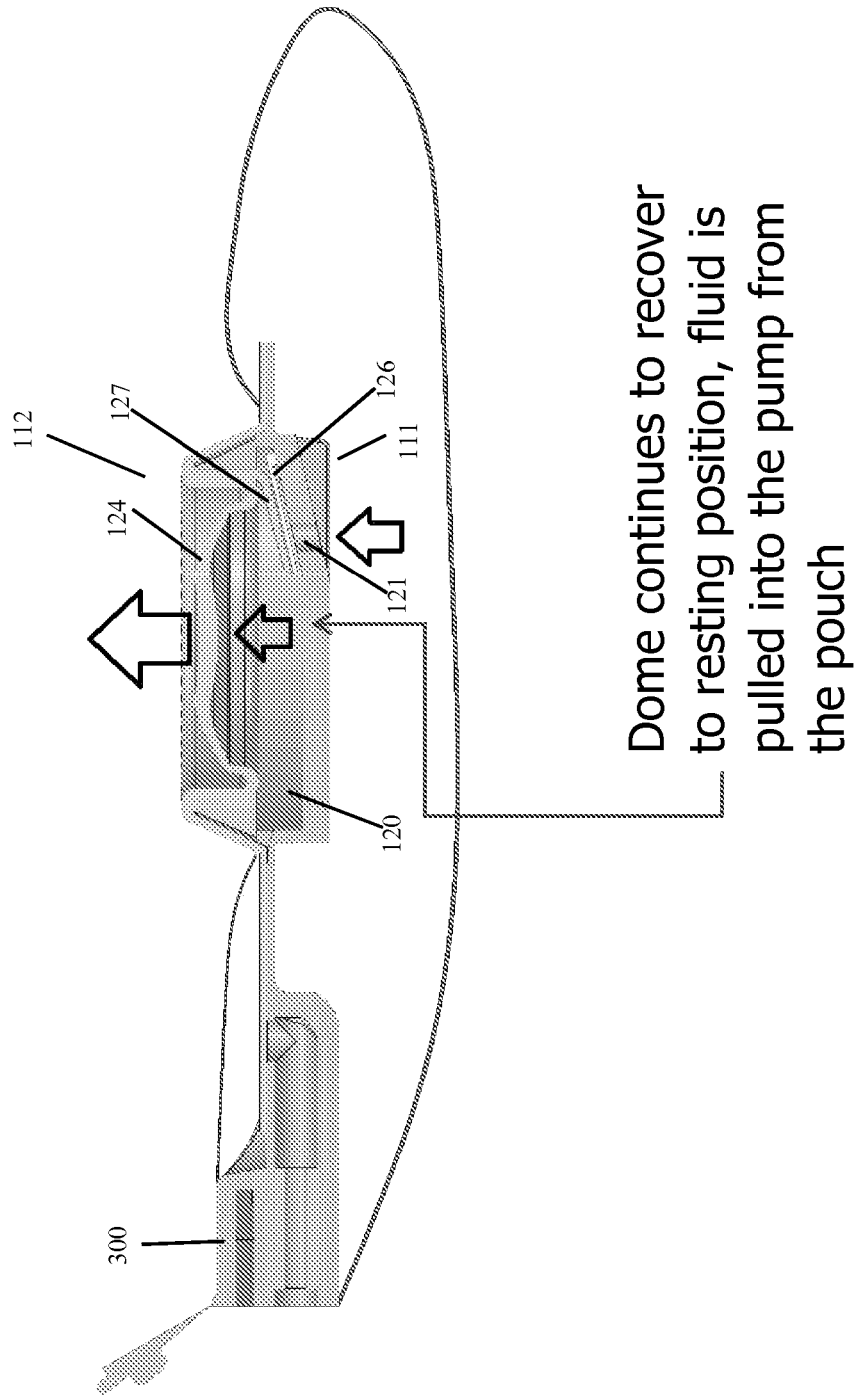
FIG. 7 is a representative cutaway side view of the embodiment shown in FIG. 1, at a second stage of recovery.

Next, and as shown in FIG. 7, bulb 124 continues to rise towards its at-rest position (shown in FIG. 1), and as it rises preferably pulls additional fluid into pump chamber 120 only through pump chamber inlet 121. Specifically, as bulb 124 rises, it further raises pump chamber inlet closure 127 away from the top of pump chamber inlet 121, allowing fluid to flow from the interior of flexible pouch 102 through pump chamber inlet 121, past thin film inlet cover 126 and into pump chamber 120 until bulb 124 reaches the end of its recovery stroke (i.e., the at-rest position reflected in FIG. 1). At this stage, fluid dispensing 100 is ready for the next dispensing operation the next time that a user engages flexible actuator 123.

With regard to further aspects of an embodiment of the invention, and with reference to FIGS. 8-12, the exterior of fluid exit channel 130 may be provided a generally cylindrical head 800 configured for insertion into a cylindrical cavity within a mating part 810. Mating part 810 may be configured for mating with any of a variety of other devices, such as (by way of non-limiting example) a container having a fluid or other substance therein intended for mixing with the contents of the flexible pouch 102 (not shown in FIGS. 8-11, and shown in phantom in FIG. 12) to which the dispensing assembly 110 is attached.

Figure 8:
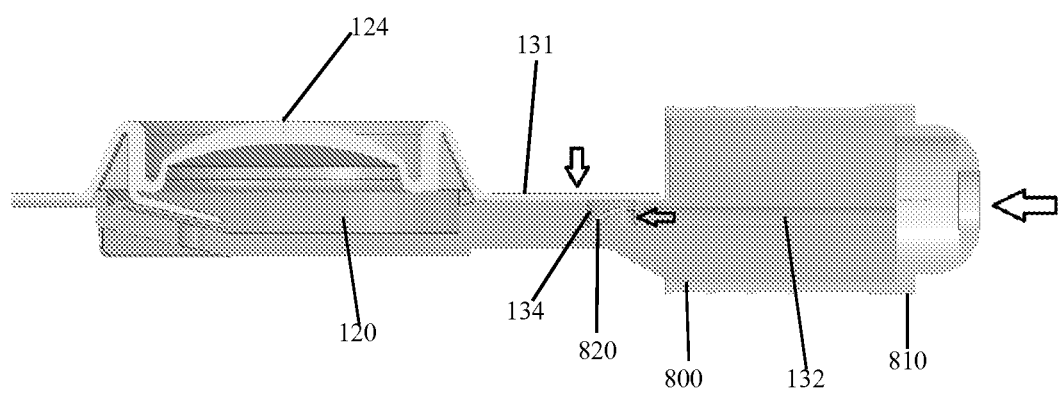
FIG. 8 is a representative cutaway side view of another embodiment of the invention.
Figure 9:
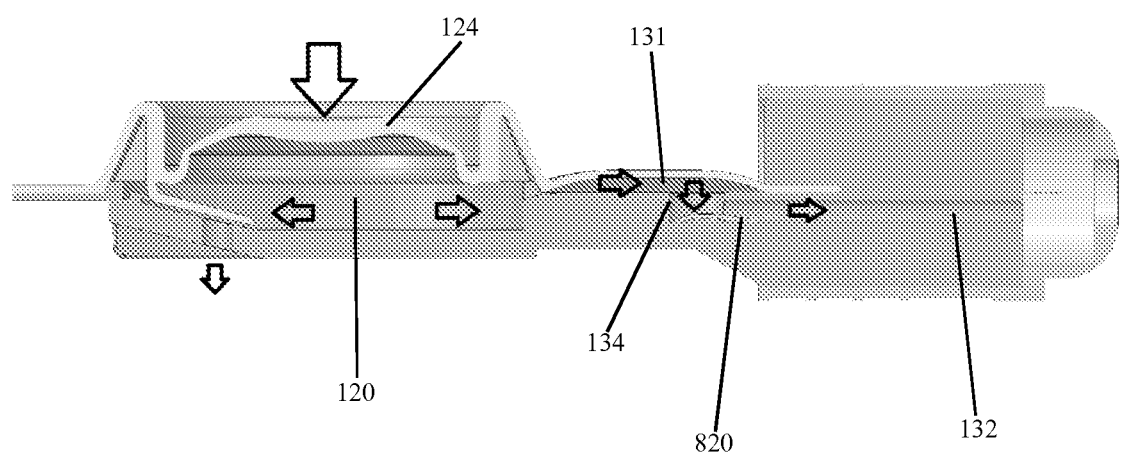
FIG. 9 is a representative cutaway side view of the embodiment shown in FIG. 8, at a first stage of activation.

As shown in FIG. 8, in order to further restrict the possible flow of fluid from outlet channel 132 into intermediate channel 131 (and thus back into pump chamber 120), which backflow could in this case possibly include fluid or other material from a container with which the contents of flexible pouch 102 are to be mixed, a flexible flap valve 820 may be provided in the acute bend portion 134 of outlet channel 132. Flexible flap valve 820 is configured so as to bend downward, as shown in FIG. 9, so as to allow fluid to flow from pump chamber 120, through intermediate chamber 131, and into outlet channel 132 for dispensing when bulb 124 is pushed downward. However, when bulb 124 is returning to its at-rest position, flexible flap valve 820 is pulled upward to the position shown in FIG. 8 so as to block fluid from flowing back into intermediate chamber 131.

Figure 10:
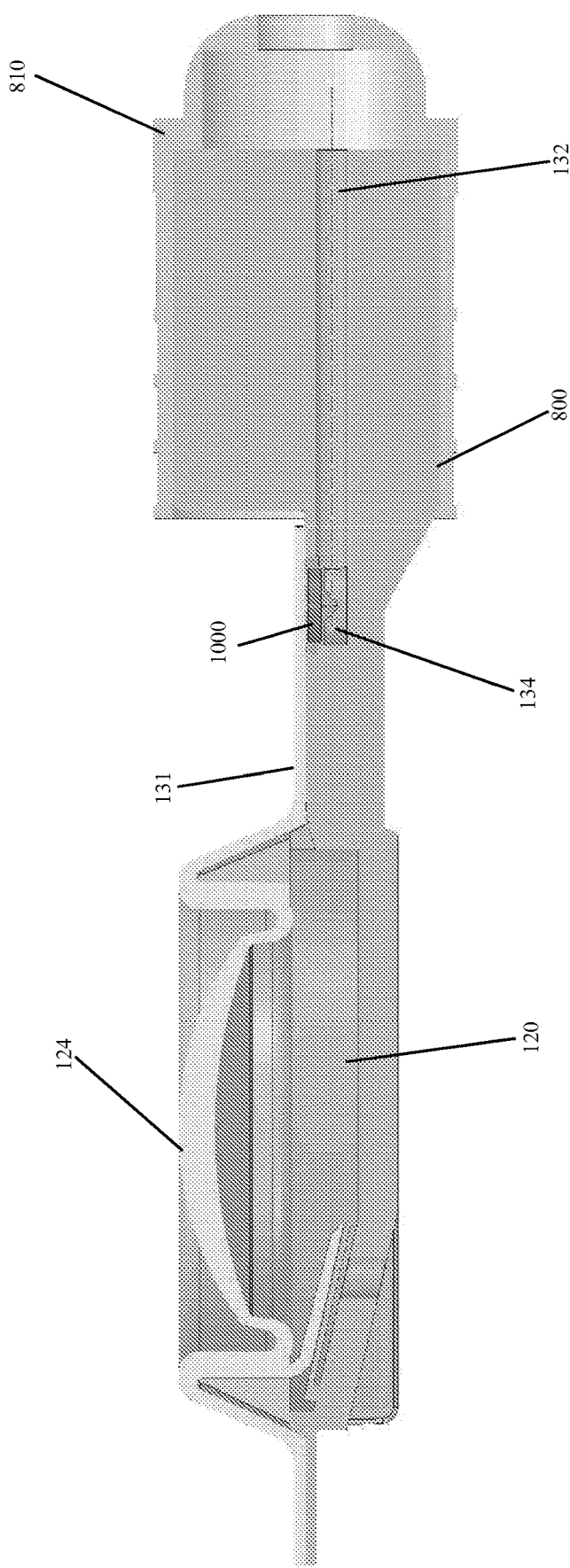
FIG. 10 is a representative cutaway side view of yet another embodiment of the invention.
Figure 11:
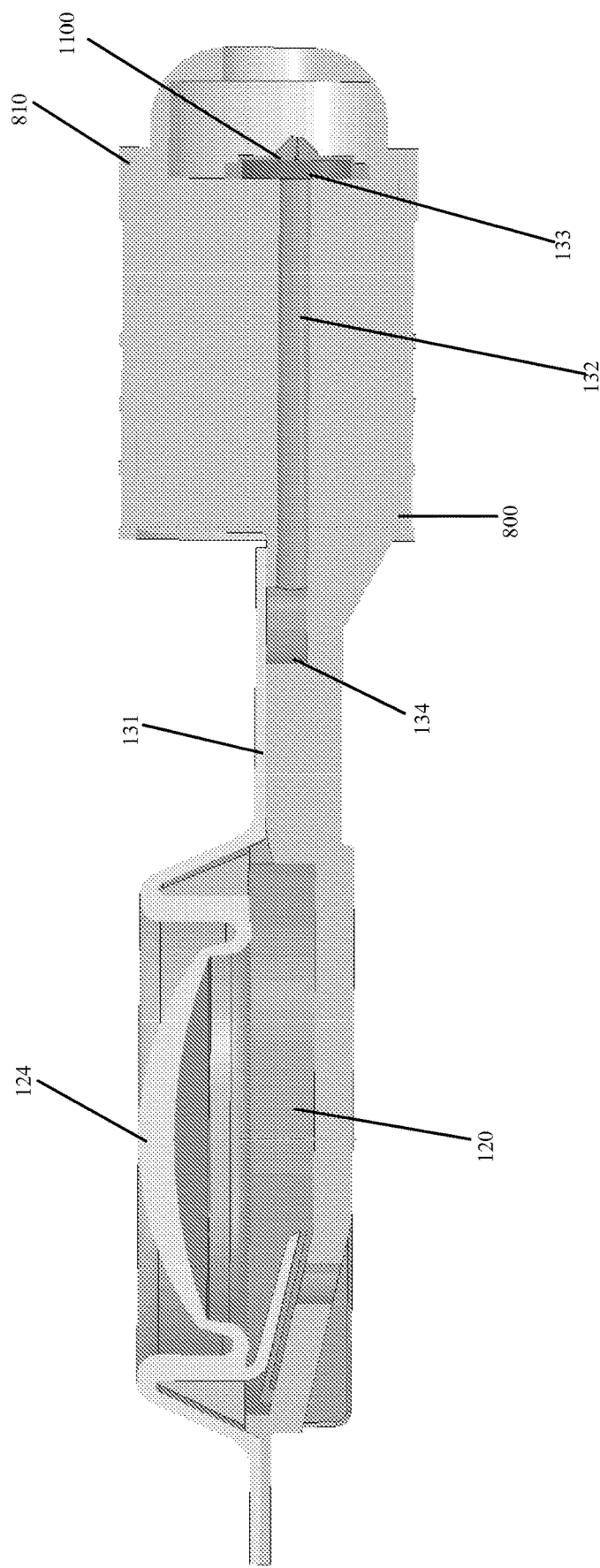
FIG. 11 is a representative cutaway side view of a further embodiment of the invention.
Figure 12:
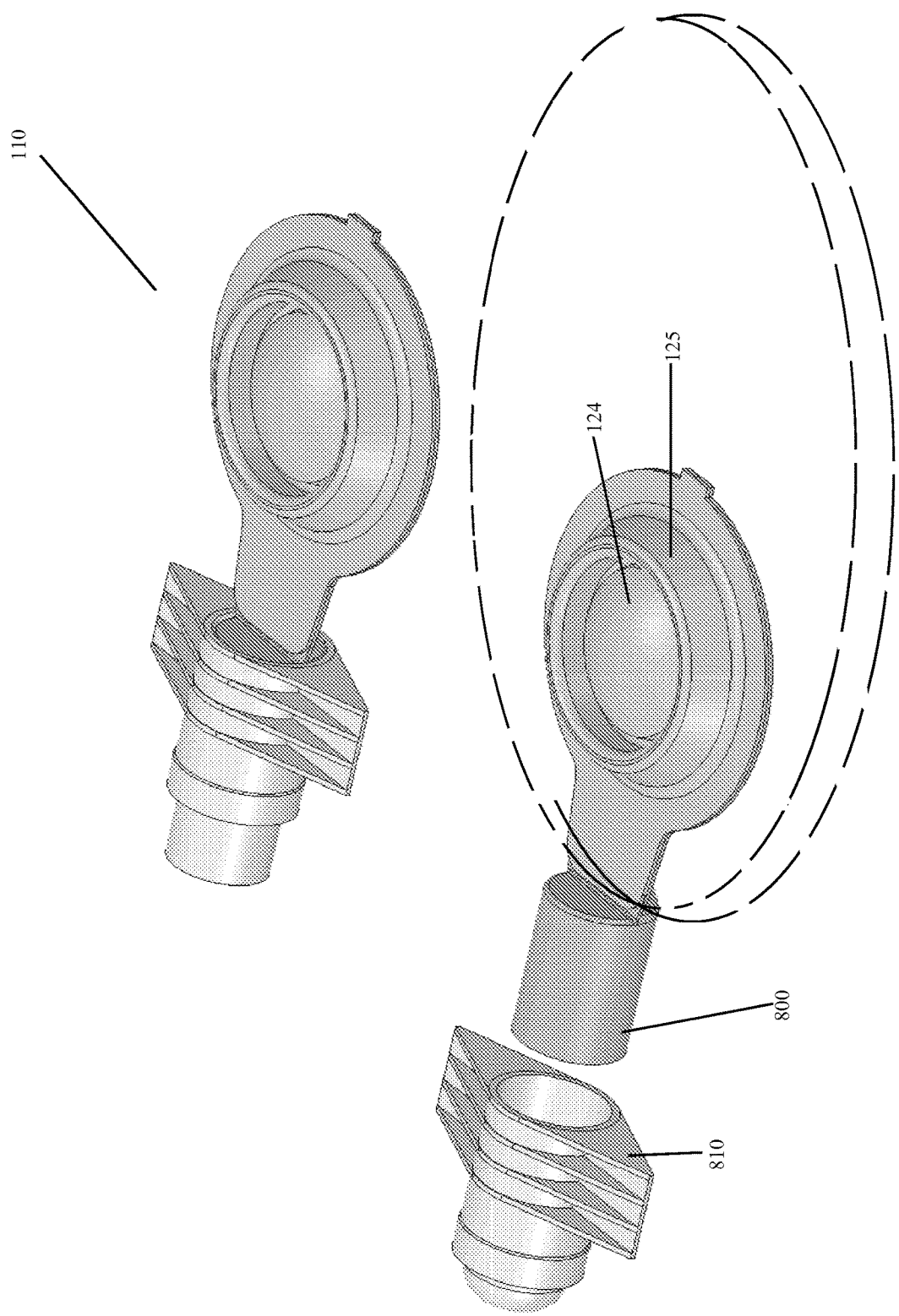
FIG. 12 is a perspective view of still further embodiments of the invention in which all portions of the dispensing assembly except the head/neck/nozzle is situated inside the flexible pouch.

Similarly, and as shown in FIG. 10, instead of providing a flexible flap valve, a duck bill valve 1000 may be positioned at the top of acute bend portion 134 of outlet channel 132. Such a duck bill valve 1000 will likewise serve as a one-way valve, allowing fluid to flow from pump chamber 120 and intermediate chamber 131 into outlet channel 132, while preventing fluid from flowing in the opposite direction As still another alternative to prevent back flow of fluid from a container with which the contents of flexible pouch 102 are to be mixed, and as shown in FIG. 11, a duck bill valve 1100 may be positioned at the fluid outlet 133 of outlet channel 132, thus preventing any mixing of external fluids with the fluid contained in flexible pouch 102 anywhere within dispensing assembly 110.

While valves 820, 1000, and 1100 are described herein as being incorporated in the configurations that employ cylindrical head 800, it is noted that such valves may likewise be incorporated into the assemblies shown in FIGS. 1-7 to provide additional flow control without departing from the spirit and scope of the instant invention.

According to alternative "floating" embodiments, shown in FIGS. 12-17, the dispensing assembly may be situated entirely inside the flexible pouch. The floating embodiments, described below, can be manufactured on existing machinery, are simpler and therefore less expensive to manufacture, and have no pump/dispensing assembly protruding externally from the product.

Figure 13:
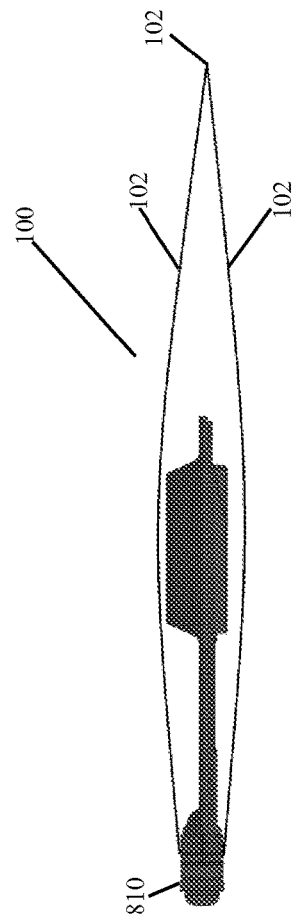
FIG. 13 is a side view of another embodiment of the invention in which all or nearly all of the dispensing assembly is situated inside the flexible pouch.
Figure 14:
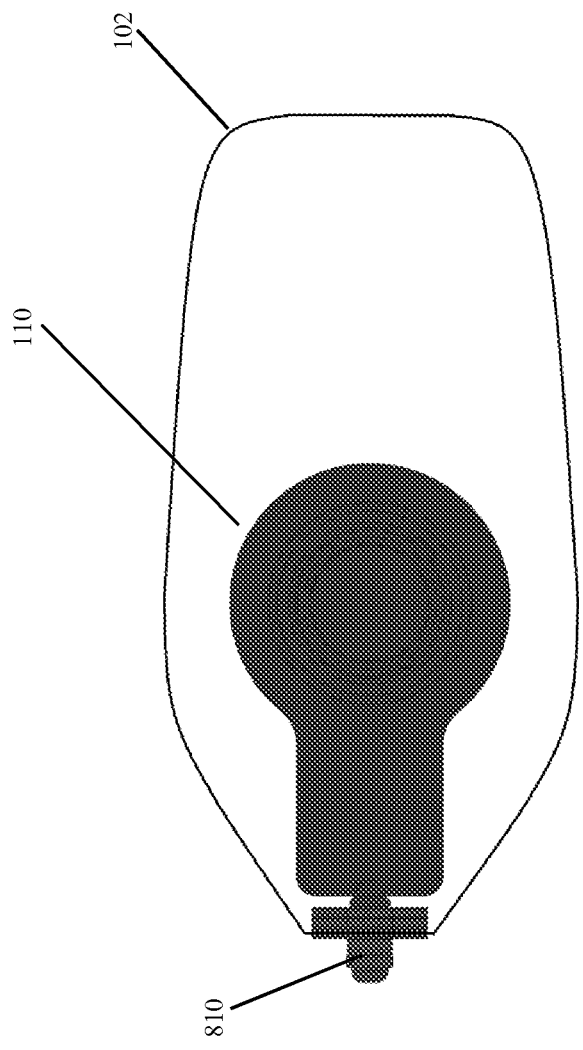
FIG. 14 is a top view of the embodiment shown in FIG. 13.
Figure 15:
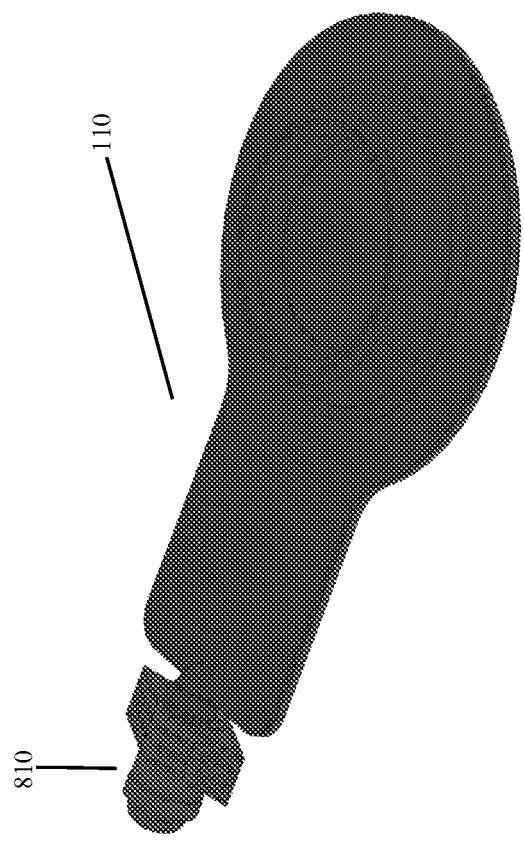
FIG. 15 is a perspective view of the dispensing assembly shown in FIGS. 13 and 14.
Figure 16:
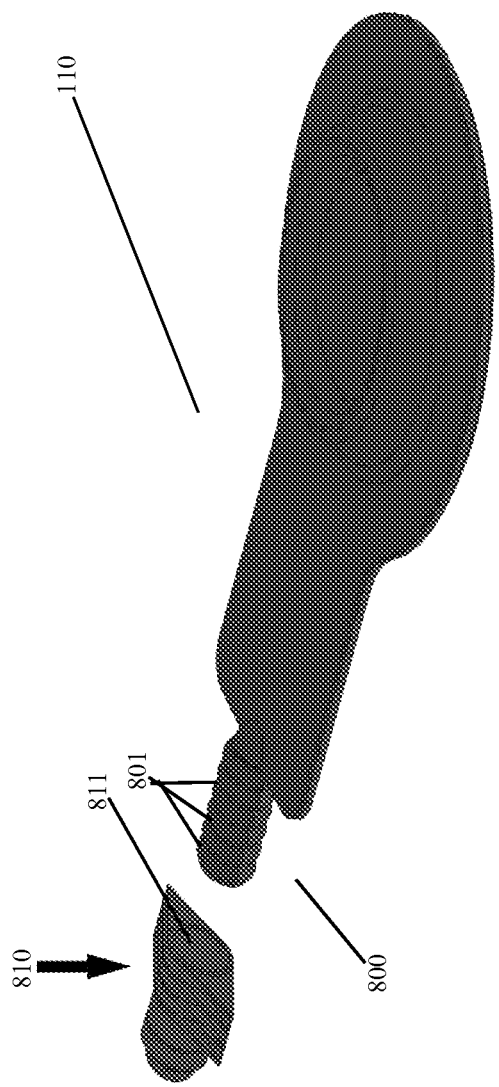
FIG. 16 is an exploded perspective view of the dispensing assembly shown in FIG. 15.

FIG. 13 shows a fluid dispenser 100 according to one alternative embodiment in which the dispensing assembly 110 is located inside the flexible pouch 102. According to one alternative embodiment, the dispensing assembly itself is not connected to any portion of the flexible pouch 102. According to this embodiment, the dispensing assembly 110 is only indirectly connected to the flexible pouch, through mating part 810. This embodiment may be manufactured by snapping the head 800 of the dispensing assembly into the throat 811 of the mating part 810, sandwiching the mating part 810 and dispensing assembly 110 between upper and lower films 102', 102", and sealing the upper and lower films to one-another along a perimeter except at the mating part 810, where the upper and lower films 102', 102" are adhered or otherwise affixed in a leak-proof manner to opposite sides of the mating part 810. According to another manufacturing embodiment, upper and lower films 102', 102" may first be adhered or sealed to the mating part 810 and to one-another along a majority of a perimeter; the dispensing assembly 110 may be inserted to the interior of the pouch 102 formed by the mating of the upper and lower films 102', 102" through an unsealed section of the pouch 102 and mated with the mating part 810, and the unsealed section may then be closed by adhesive, heat sealing or other method.

According to either manufacture method described above, or according to any other method, the head 800 of dispensing assembly may be configured with a series of ribs and/or detents 801. According to a further alternative embodiment, the interior surface of the mating part throat 811 may be configured to have complementary or matching detents, ribs, or other features to receive the neck of the dispensing assembly in a tight fitting and/or quantum step fashion.

According to some internal pump embodiments of the invention, the dispensing assembly may be configured the same or substantially the same as the dispensing assemblies described herein with respect to FIGS. 1-12.

According to other internal pump embodiments of the invention, the dispensing assembly may be configured substantially the same as the dispensing assemblies described herein with respect to FIGS. 1-12, except that where FIGS. 1-12 show both a thin cover 126 and pump chamber inlet closure 127 positioned over pump chamber inlet 121, the inlet valve is a membrane only structure.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:
1. A fluid dispending device comprising:
 a flexible actuator comprising a flexible dome, a flange extension, and a raise circumferential wall surrounding said flexible dome and connected to said flexible dome at a lower end of the raised circumferential wall;

a base portion comprising a bottom portion of a pump chamber inlet said flexible actuator mated to said base portion so that said flexible dome and said bottom portion of the pump chamber form a pump chamber, said pump changer having an outlet;

a dispensing head comprising a fluid outlet channel in fluid communication with said outlet;

an inlet valve positioned in proximity to said pump chamber inlet to selectively permit fluid flow through the pump chamber inlet, said inlet valve comprising an inlet closure attached at one end of the lower end of the raised circumferential wall of the flexible actuator allowing a remaining portion of said closure to move between open and closed positions over the pump chamber inlet; and wherein said inlet valve comprises a flap integrally formed with said flexible actuator and a flexible film attached to said bottom portion.

2. A fluid dispensing device comprising:

a flexible actuator comprising a flexible dome, a flange extension, and a raised circumferential wall surrounding said flexible dome and connected to said flexible dome at a lower end of the raised circumferential wall;

a base portion comprising a bottom portion of a pump chamber and a pump chamber inlet said flexible actuator mated to said base portion so that said flexible dome and said bottom portion of the pump chamber form a pump chamber, said pump chamber having an outlet;

a dispensing head comprising a fluid outlet communication with said outlet;

an inlet valve position in proximity to said pump chamber inlet to selectively permit fluid flow through the pump chamber inlet, said inlet valve comprising an inlet closure attached at one end to the lower end of the raised circumferential wall of the flexible actuator allowing a remaining portion of said closure to move between open and closed positions over the pump chamber inlet; and a flexible fluid pouch having two opening, wherein a first opening is sealed around said flexible actuator, and a second opening is sealed around said dispensing head, and wherein said flexible flange extension and all of said bottom portion reside in an interior of said flexible fluid pouch.

3. A fluid dispensing device according to claim 2, configured so that increases in pressure on said flexible fluid pouch cause said outlet to seal more tightly against unintentional release of fluid.

4. A fluid dispensing device comprising:

a flexible actuator comprising a flexible dome, a flange extension, and a raised circumferential wall surrounding said flexible dome and connected to said flexible dome at a lower end of the raised circumferential wall;

a base portion comprising a bottom portion of a pump chamber and a pump chamber inlet said flexible actuator mated to said base portion so that said flexible dome and said bottom portion of the pump chamber form a pump chamber, said pump chamber having an outlet;

a dispensing head comprising a fluid outlet communication with said outlet;

an inlet valve position in proximity to said pump chamber inlet to selectively permit fluid flow through the pump chamber inlet, said inlet valve comprising an inlet closure attached at one end to the lower end of the raised circumferential wall of the flexible actuator allowing a remaining portion of said closure to move between open and closed positions over the pump chamber inlet; and a flexible fluid pouch having a single opening, said opening sealed around said dispensing head, wherein the entirety of said flexible actuator and said bottom portion reside in the interior of said flexible fluid pouch.

5. A fluid dispensing device according to claim 4, configured to dispense a volume of fluid that is less than the volume of said pump chamber.

6. A fluid dispensing device according to claim 4, wherein said pump chamber outlet permits the flow of fluid toward the fluid outlet channel during activation of the flexible dome, and toward the pump chamber when the flexible dome is released.

7. A fluid dispensing device according to claim 4, wherein said inlet valve initially permits fluid flow away from the pump chamber during activation of the flexible dome, and permits the flow of fluid into the pump chamber following release of the flexible dome.

8. A fluid dispensing device according to claim 4, wherein said inlet valve is attached to said base portion.

9. A fluid dispensing device according to claim 4, said device defining a flow path having an acute angle between said outlet and said fluid outlet channel.

* * * * *